United States Patent
Conner et al.

(10) Patent No.: US 7,392,053 B1
(45) Date of Patent: Jun. 24, 2008

(54) METHOD AND APPARATUS FOR SELECTIVE LISTENING IN A DYNAMICALLY CONFIGURED WIRELESS NETWORK

(75) Inventors: W. Steven Conner, Hillsboro, OR (US); Jasmeet Chhabra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1007 days.

(21) Appl. No.: 10/409,216

(22) Filed: Apr. 8, 2003

(51) Int. Cl.
*H04Q 7/20* (2006.01)

(52) U.S. Cl. ........................ 455/445; 455/517

(58) Field of Classification Search ........ None
See application file for complete search history.

(56) References Cited

U.S. PATENT DOCUMENTS

| | | |
|---|---|---|
| 5,717,687 A | 2/1998 | Minot et al. |
| 6,791,949 B1 | 9/2004 | Ryu et al. |
| 6,823,395 B1 | 11/2004 | Adolfsson |
| 6,961,573 B1 * | 11/2005 | Moon et al. ........ 455/445 |
| 7,171,476 B2 * | 1/2007 | Maeda et al. ....... 709/227 |
| 7,251,222 B2 * | 7/2007 | Chen et al. ......... 370/256 |
| 2002/0103893 A1 | 8/2002 | Frelechoux et al. |
| 2002/0145978 A1 * | 10/2002 | Batsell et al. ...... 370/238 |
| 2003/0117966 A1 | 6/2003 | Chen |
| 2003/0137930 A1 | 7/2003 | Futernik |
| 2003/0202524 A1 * | 10/2003 | Conner et al. ...... 370/408 |
| 2006/0215593 A1 * | 9/2006 | Wang et al. ......... 370/315 |

OTHER PUBLICATIONS

Benjie Chen, et al., "SPAN: An Energy Efficient Coordination ALG. for Topology Maintenance in Ad Hoc Wireless Networks," Laboratory for Computer Science, MIT, Cambridge, MA, Jul. 2001.
Xu, Y. et al., "Geography-informed Energy Conservation for Ad Hoc Routing", *Information Science Institute*, (Jul. 2001).

* cited by examiner

*Primary Examiner*—Ramnandan Singh
(74) *Attorney, Agent, or Firm*—The Law Offices of John C. Scott, LLC; John C. Scott (57) ABSTRACT

Nodes of an ad-hoc network may determine a category assigned to neighbor nodes and may select a communication pattern for communicating with the neighbor nodes based on their assigned categories. The category may be associated with a node's role in the network.

19 Claims, 5 Drawing Sheets

SELECTIVE LISTENING $n$ = # of neighbor nodes
$m$ = # of relay nodes
$k$ = # of nodes electing a given PR
$1/H_L$ = hello message listen rate

SELECTIVE LISTENING n = # of neighbor nodes
m = # of relay nodes
k = # of nodes electing a given PR
$1/H_L$ = hello message listen rate

METHOD AND APPARATUS FOR SELECTIVE LISTENING IN A DYNAMICALLY CONFIGURED WIRELESS NETWORK

TECHNICAL FIELD

The present invention pertains to wireless communications and, in embodiments, to peer-to-peer wireless networks.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention encompass the full scope of the claims and all available equivalents.

Figure 1:
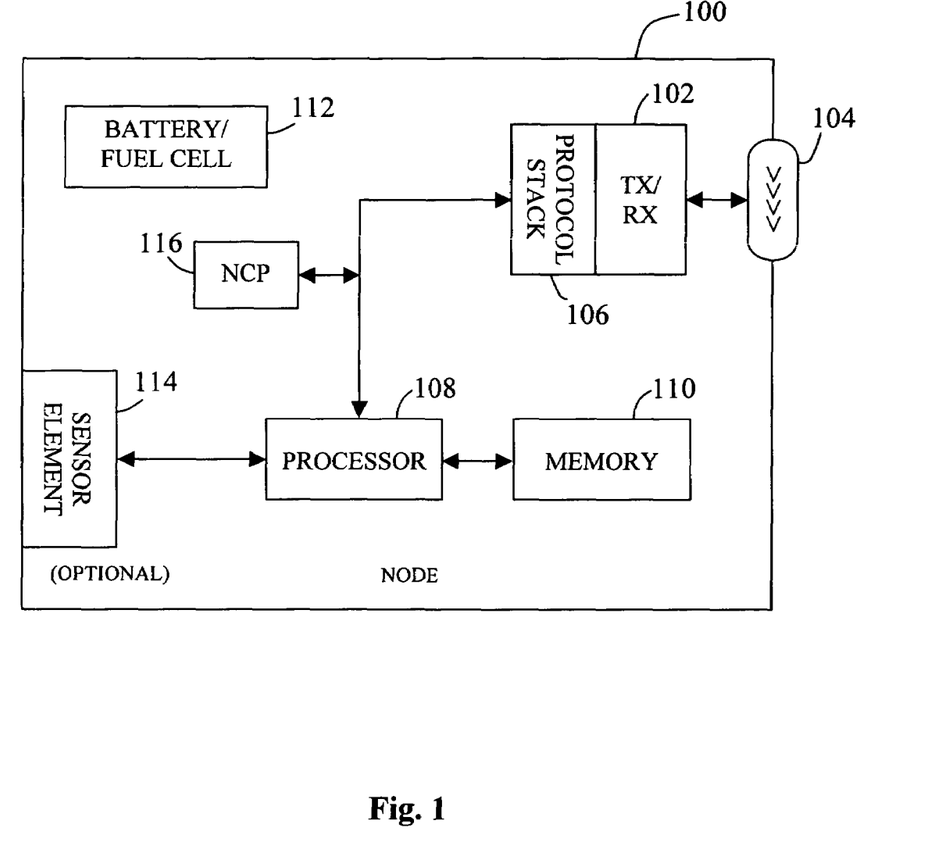
FIG. 1 is a simplified block diagram of an example wireless node in accordance with an embodiment of the present invention.

FIG. 1 is a block diagram of an example wireless node 100 in accordance with an embodiment of the present invention. Node 100 may be one node of an ad-hoc network and may determine a category assigned to neighbor nodes. Node 100 may select a communication pattern for communicating with the neighbor nodes based on their assigned category. The category may be associated with the node's role in the network. In embodiments, the nodes of the network may establish a backbone communication path within the network. Non-relay nodes may elect one neighbor node as a primary relay node for communicating, secondary relay nodes route packets between primary relay nodes, and primary relay nodes route packets along the backbone communication path. The backbone communication path may be comprised of primary and secondary relay nodes having communication links there between.

Although node 100 is illustrated as having several separate functional elements, one or more of the functional elements may be combined and may be implemented by combinations of software configured elements, such as processing elements including digital signal processors (DSPs), and/or other hardware elements. For example, processing elements may comprise one or more microprocessors, DSPs, Pals, application specific integrated circuits (ASICs), and combinations of various hardware and logic circuitry for at least performing the functions described herein.

Node 100 may include transceiver element 102 which may receive and/or transmit RF communications over antenna element 104 with other nodes of a network (other forms of wireless communication such as, for example, infrared communication as well as wired communication may alternatively be used). Node 100 may also include protocol stack 106 to interface with transceiver element 102 in providing communication. In embodiments, protocol stack 106 and transceiver element 102 may provide RF communications in accordance with one or more communication techniques. Examples include wireless personal area network (WPAN) type network communications in accordance with IEEE 802.15 or Bluetooth, wireless local area network (WLAN) type network communications in accordance with one of the IEEE 802.11 protocols (including those that support multi-hop TDMA techniques), and others.

Node 100 may also include processing element 108 to implement various firmware and software in conjunction with memory element 110. Node 100 may include power source 112 which may be, for example, a battery, a fuel cell, and/or others. In some embodiments, when node 100 performs sensing functions, node 100 may include a sensing and/or actuating element 114 to generate sensor data.

Antenna element 104 may be a dipole antenna, a monopole antenna, a loop antenna, a microstrip antenna, or other type of antenna suitable for reception and/or transmission of RF signals for which node 100 may be configured. In embodiments, transceiver 102 may implement one or more of many communication techniques including, for example, time-division multiple-access (TDMA) communications, frequency-division multiple-access communications (FDMA), code-division multiple-access communications (CDMA), wideband code-division multiple-access communications (WCDMA), and combinations thereof.

In at least one embodiment, node 100 may include a Neighbor Communication Pattern (NCP) component 116 to implement selective listening functions for the node 100. The NCP component 116 may be a separate element within the node 100 or it may be implemented as part of another element or elements such as, for example, the processor 108, the protocol stack 106, and/or others. In at least one implementation, the NCP component 116 may track the roles of neighboring nodes with respect to an ad hoc routing or other self-organization protocol. The NCP component 116 may classify the local node and each of its immediate neighbors into a set of pre-defined or dynamically-defined/negotiated roles based on protocol state information and map each pair of node/role combinations into an appropriate communication pattern, typically relating to frequency of communication. In one approach, the NCP component 116 may compute a function $NCP(type_n, type_m)$. signifying the pattern by which a node of type n listens to receive packets from a node of type m. For example, the pattern could be implemented as $modulo(L_{nm})$, where the listen rate between nodes of type n and m is $1/L_{nm}$. A node of type n will wake up every $1/L_{nm}$ slots/epochs to listen for a packet from a node of type m when $(sequence\#_{send} \% L_{nm})==0$, where $sequence\#_{send}$ is a sequence number incremented by the transmitting node each send slot or epoch. The $modulo(L_{nm})$ pattern function is only one example of an NCP function. Another example is pseudo-random functions that are shared between nodes in a network, allowing receivers to predict the sequence of packet transmission sequence numbers of a transmitter based on its role in the network. Other patterns, including more complex patterns, may also be used.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

Figure 2:
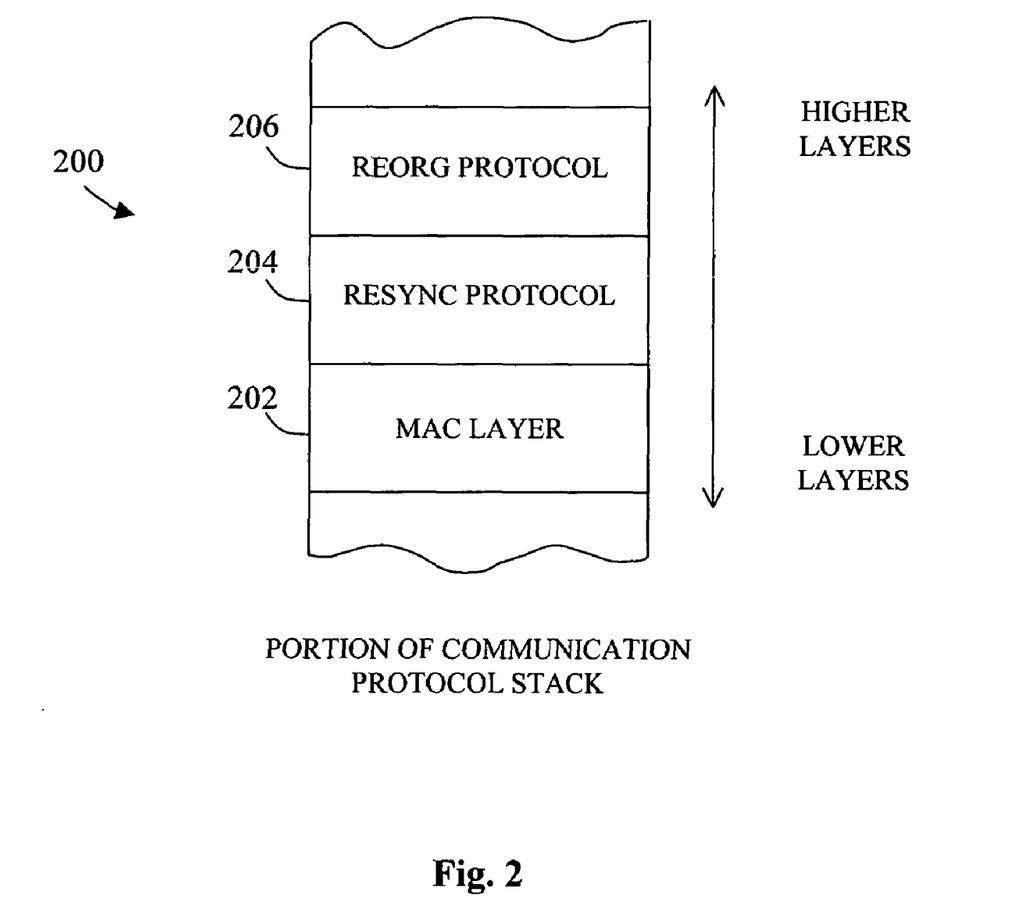
FIG. 2 illustrates of a portion of an example communication protocol stack in accordance with an embodiment of the present invention.

FIG. 2 illustrates a portion of an example communication protocol stack in accordance with an embodiment of the present invention. Protocol stack 200 may include a portion of the protocol layers suitable for use as protocol stack 106 of node 100 (see FIG. 1), although other portions of a communication protocol stack may also be suitable. Protocol stack 200 includes a media access control (MAC) layer 202 which may coordinate communications between other nodes of a network and, in at least one embodiment, coordinate TDMA with neighbor nodes.

Protocol stack 200 may also include ReSync protocol layer 204 which may implement a synchronization protocol. ReSync protocol layer 204 may be a synchronization-based MAC protocol for synchronization communication with neighbor nodes. An example of a synchronization-based MAC protocol that may be used is ReSync protocol layer 204 is found in U.S. patent application Ser. No. 10/153,935 entitled "CONSERVING ENERGY IN NETWORKS," filed May 22, 2002, assigned to the same assignee as the present invention, and incorporated herein by reference. Other synchronization-based MAC protocols are also suitable for use as ReSync protocol layer 204.

Protocol stack 200 may also include ReOrg protocol layer 206 for network organization and routing. Layer 206 may implement a self-organization protocol with other network nodes to create a virtual routing topology. An example of a self-organization protocol that may be used as ReOrg protocol layer 206 is found in U.S. patent application Ser. No. 10/132,947 entitled "AD HOC NETWORK HAVING A BACKBONE DETERMINED AT LEAST IN PART ON A METRIC AND METHOD THEREFOR," filed Apr. 26, 2002, assigned to the same assignee as the present invention, and incorporated herein by reference. Other self-organization protocols are also suitable for use as ReOrg protocol layer 206.

Figure 3:
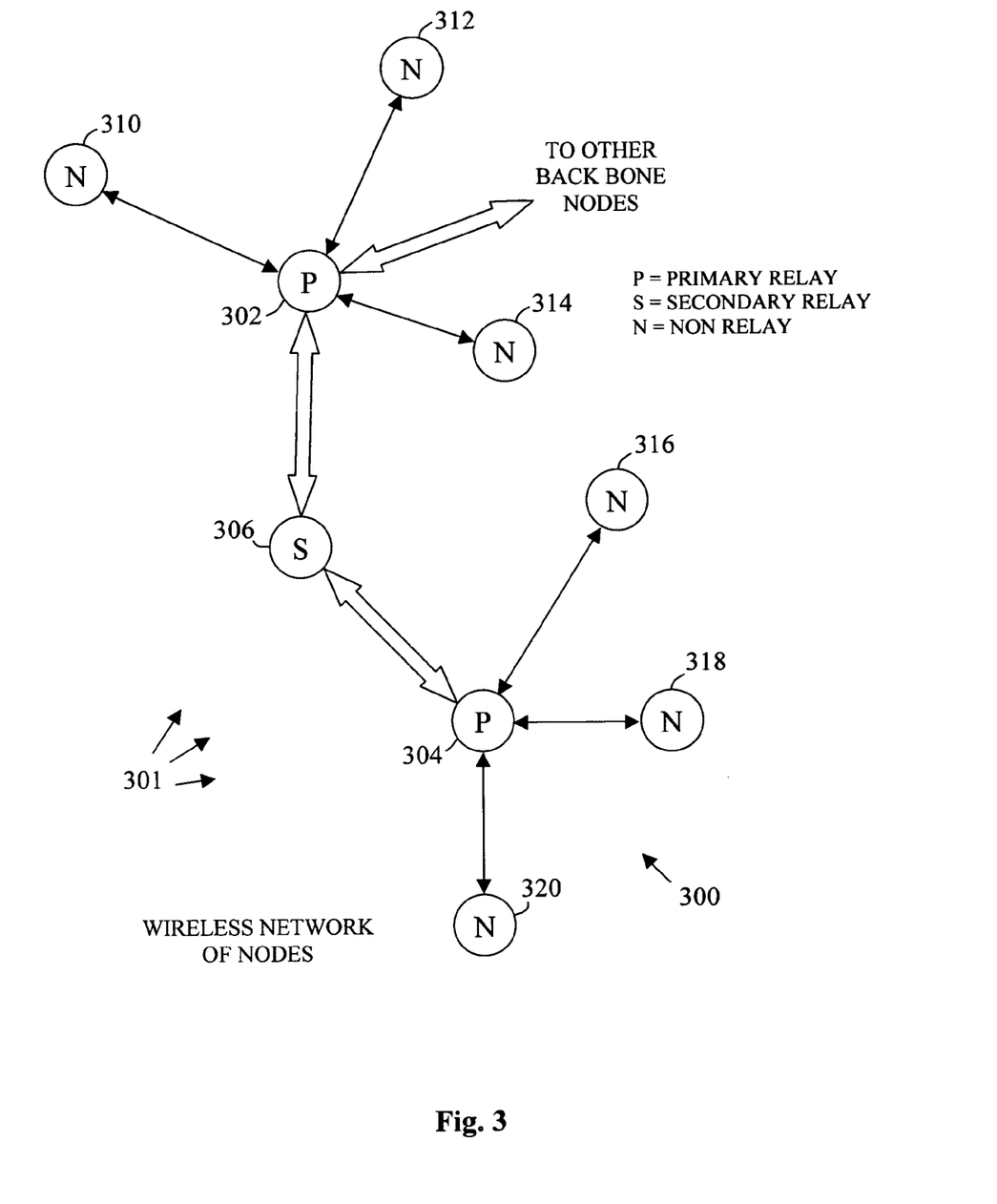
FIG. 3 illustrates an example network of wireless nodes in accordance with embodiments of the present invention.

FIG. 3 illustrates an example network 300 of wireless nodes in accordance with embodiments of the present invention. As shown, the network 300 may include a number of wireless nodes 302, 304, 306, 310, 312, 314, 316, 318, 320 that may each include wireless transceiver functionality. The number of nodes within such a network may vary from implementation to implementation. In embodiments, network 300 may include hundreds or even thousands or more of nodes 301. Wireless node 100 (see FIG. 1) is an example of a node suitable for use as any one of nodes 301 of network 300, although other nodes may also be equally suitable. In some embodiments, network 300 may be an ad-hoc network or peer-to-peer type network in which the nodes communicate with each other over communication links established therebetween. In other embodiments, network 300 may be a WPAN type network which performs peer-to-peer addressing in accordance with, for example, IEEE 802.15.3 or a WLAN type network which communicates in accordance with one of the IEEE 802.11 protocols, including those that support multi-hop TDMA techniques.

In these embodiments, some or all of the nodes may be sensor nodes which perform a sensing function and transmit sensor data (e.g., in the case of a sensor network), while some or all of the nodes may be wireless communication devices as discussed above. Some examples of sensor network applications include: (a) agricultural networks such as networks including, for example, temperature sensors to detect frost in a vineyard, acidity sensors to sense soil acidity, moisture sensors to monitor irrigation, and/or other sensor types, (b) industrial networks such as networks including, for example, motion detectors to monitor occupancy of conference rooms, vending rooms, and/or other shared resources in a building, magnetometers to monitor occupancy of parking spaces to guide cars to a nearest empty space, temperature sensors linked to an air conditioner and/or heating unit for precision heating and cooling, and/or other sensor types, and (c) environmental networks such as networks including seismic sensors to monitor precise volcanic activity across a mountain range, temperature/pressure sensors to monitor the nesting habits of endangered birds, audio sensors to detect rare birds in a forest, and/or other sensor types. Many other sensor network applications also exist.

Nodes 301 may identify nodes of network 300 that are neighbor nodes by their communication radius through a discovery process. Although some nodes may be able to transmit and receive over greater distances than other nodes, neighbor nodes generally require that both nodes be within communication radius of each other (e.g., able to communication with each other). For example, node 302 may be a neighbor node with nodes 306, 310, 312 and 314, but not with node 304. Similarly, nodes 310 and 312 may be neighbor nodes, but neither may be a neighbor node with node 314, for example. In accordance with embodiments of the present invention, each node has a number of neighbor nodes (n) that it can communicate with. The number of neighbor nodes may change as nodes 301 are added to or removed from network 300 or as the nodes may change their relative position within network 300, or due to environmental changes.

Figure 4:
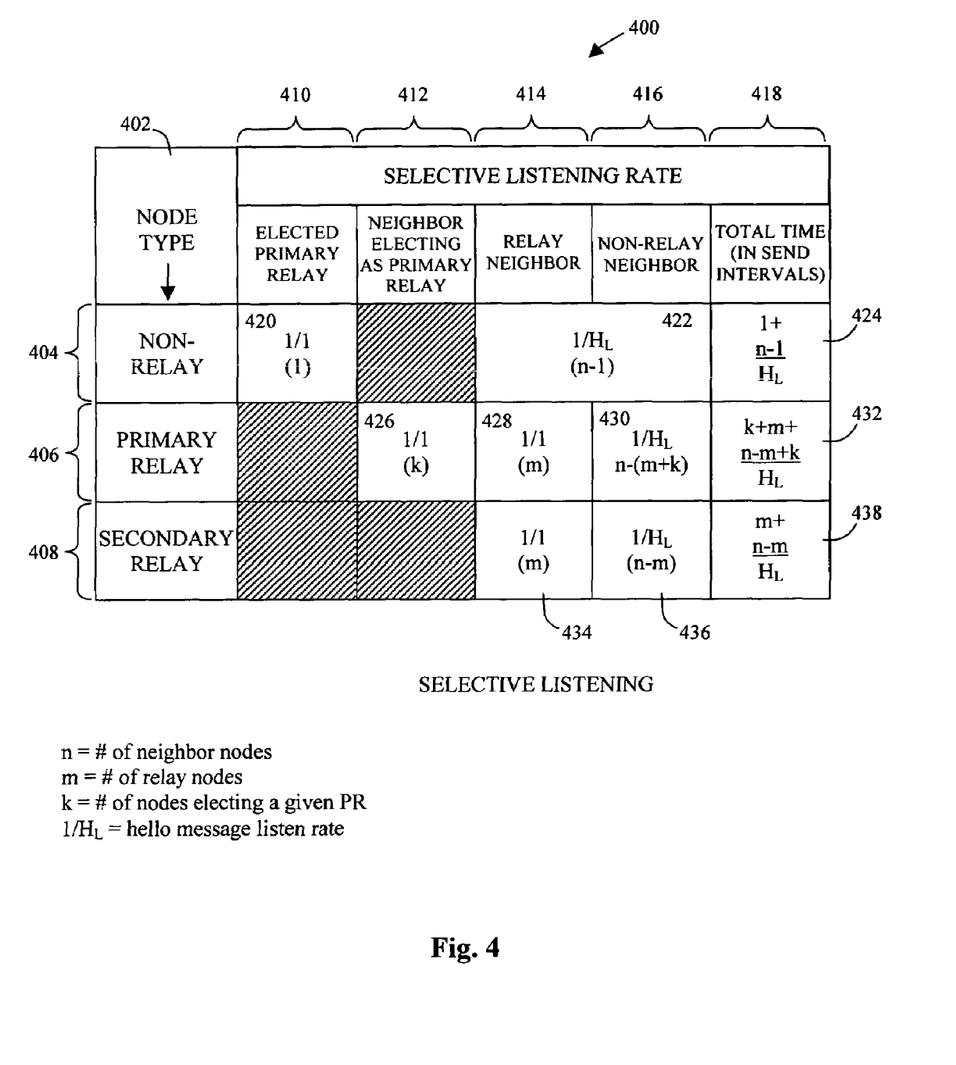
FIG. 4 is a table illustrating selective communication patterns of nodes in accordance with an embodiment of the present invention.

FIG. 4 is a table illustrating example selective listening rates of nodes in accordance with an embodiment of the present invention. Table 400 illustrates an example of selective communication patterns for nodes of a particular classification (node type) when communicating with other nodes of a particular category. Table 400, for example, may be suitable for use in determining communication patterns of nodes, such as one of nodes 302, 304, 306, 310, 312, 314, 316, 318, 320 (see FIG. 3). Nodes in column 402 may be classified into non-relay category 404, primary relay category 406, or secondary relay category 408. The method for classification of nodes is discussed below. In embodiments, the classification of a node into a particular category (e.g., a primary relay, a secondary relay, or non-relay) may be dynamically changed, for example, as the configuration of nodes changes, as the energy level of the node changes, and to allow non-relay nodes to become relay nodes to share routing responsibility.

As indicated at table entry 420, non-relay nodes (indicated in row 404) may communicate with their elected primary relay node (indicated in column 410) once every send interval. For example, each of non-relay nodes 310, 312 and 314

(see FIG. 3) communicate with primary relay node 302 (see FIG. 3) once every send interval.

As indicated by table entry 412, non-relay nodes may communicate with relay neighbor nodes (column 414) and non-relay neighbor nodes (column 416) at the hello message listen rate ($1/H_L$). For example, a non-relay node may have n neighbor nodes, one of which has been elected as a primary relay node. In this example, the non-relay node may communicate with each of the n−1 (non-elected) neighbor nodes at the hello message listen rate. It would not matter whether the non-elected node is a relay neighbor node (column 414) or a non-relay neighbor node (column 416). In referring to FIG. 3, non-relay node 314, for example, may communicate with relay neighbor node 306 at the hello message listen rate, non-relay neighbor node 314 at the hello message listen rate and any other non-elected neighbor nodes (if any) at the hello message listen rate. The total communication time for a non-relay node is indicated in column 418 as table entry 424 as the sum of table entries 420 and 422. As can be seen, communication time is reduced appreciably below that of the send interval with each neighbor.

Nodes classified as primary relay nodes (as indicated in row 406) may communicate with neighbor nodes that have elected them as their primary relay (as indicated in column 412) once every send interval as indicated by table entry 426. For example, when k neighbor nodes elected a node as a primary relay, the primary relay communicates with each of the k neighbor nodes once every send interval. A primary relay node may communicate with each relay neighbor that has not elected it as a primary relay once every send interval, as indicated by table entry 428. In addition, the primary relay node may communicate with non-relay neighbors at the hello message listen rate. When the primary relay node has n neighbor nodes, k of which elected it as a primary relay and m which are relay neighbors, the primary relay node may have n−(m+k) non-relay neighbor nodes to communicate with at the hello message listen rate indicated by table entry 430. The total communication time for a primary relay node is indicated in column 418 as table entry 432 as the sum of table entries 426, 428 and 430. As can be seen, communication time for a primary relay node may be reduced appreciably. In referring to the example illustrated in FIG. 3, primary relay node 302 may communicate with neighbor nodes 310, 312 and 314 (k=3) once every send interval, may communicate with relay neighbor node 306 (m=1) once every send interval, and may communication with non-relay neighbors (possibly node 316) at the hello message listen rate.

Nodes classified as secondary relays (as indicated in row 408) do not generally elect primary relays and do not generally have neighbors electing them as a primary relay and accordingly do not have table entries in columns 410 and 412. Secondary relay nodes, however, may communicate with each of their relay neighbor nodes once every send interval as indicated by table entry 434. Secondary relay nodes may also communicate with each of their non-relay neighbor nodes at the hello message listen rate as indicated by table entry 436. The total communication time for a secondary relay node is indicated in table entry 438 of column 418 as the sum of table entries 434 and 436. As can be seen, communication time for a primary relay node may be reduced appreciably. In referring to the example of FIG. 3, secondary relay 306 may communicate with neighbor relay nodes 302 and 304 once every send interval and may communicate with non-neighbor relay nodes 314 and 316 at the hello message listen rate. In this example, secondary relay node 306 may have four neighbor nodes (n=4) and two relay neighbors (m=2).

Figure 5:
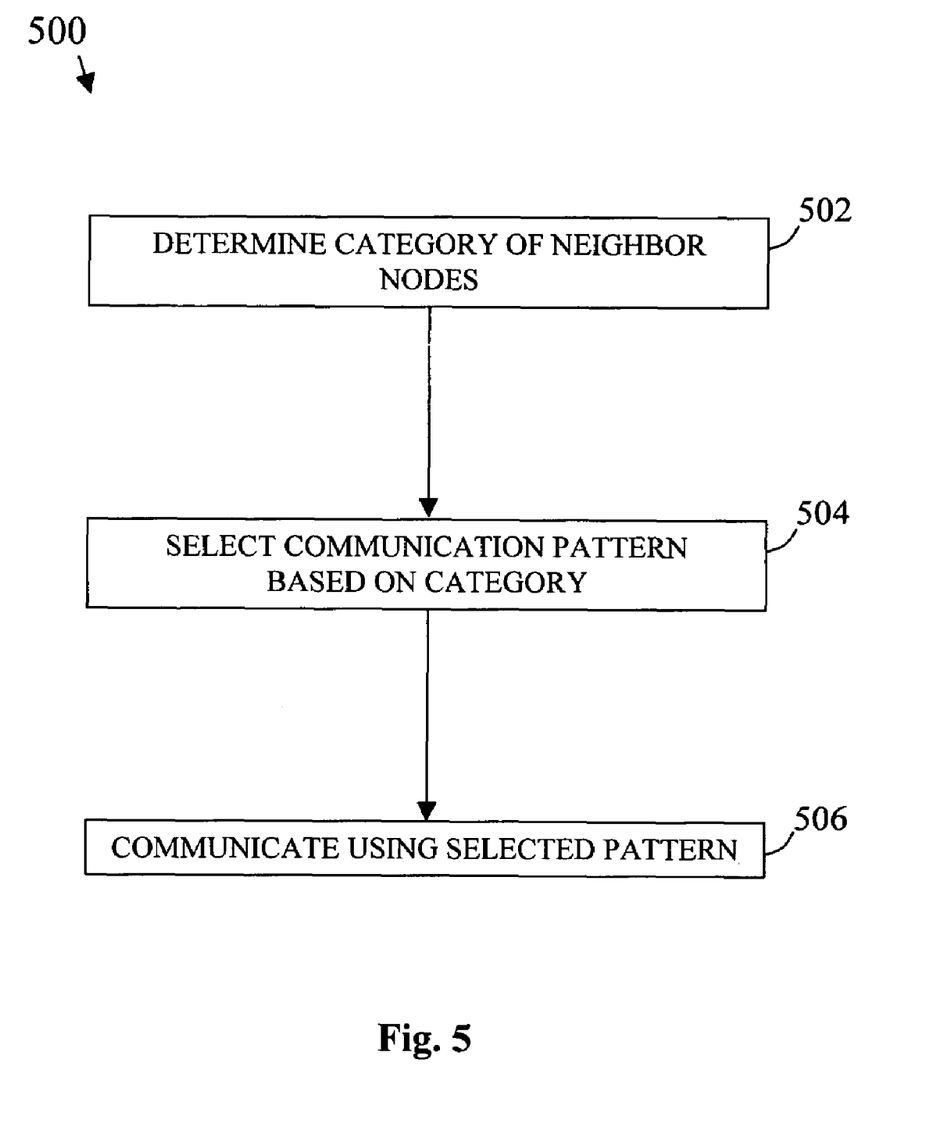
FIG. 5 is a flow chart of an example selective communicating procedure in accordance with an embodiment of the present invention.

FIG. 5 is a flow chart illustrating an example wireless node selective communicating procedure 500 in accordance with an embodiment of the present invention. As shown, a category is first determined for one or more neighbor nodes (block 502). A communication pattern is then selected for one or more neighbor nodes based on category (block 504). The node is then allowed to communicate with neighbor nodes using the selected pattern(s) (block 506).

The principles of the present invention may be used in a wide variety of different applications. For example, in at least one implementation, selective listening is used in a traditional ad hoc network without a relay backbone, running a routing protocol such as the Destination-Sequenced Distance Vector (DSDV) routing protocol. In one such scenario, the inventive principles are implemented within a system where a mesh network is used to extend the range of a wireless access point. In such a system, nodes periodically broadcast route update messages using, for example, a Bellman-Ford based algorithm, advertising a route cost to reach the destination. Based on these route discovery/maintenance messages, each node in the network learns the best next hop node along a route to the access point, establishing a routing tree rooted at the access point. Nodes may transmit data to the base station hop by hop using the routes established by DSDV. While nodes in the network must maintain high duty cycle links along a route to the access point (i.e., to support low-latency, high-throughput communication), route maintenance requires a significantly lower duty cycle. By selectively listening to children and parent neighboring nodes at high duty cycle, and reducing the listening frequency for remaining neighbors to the minimum frequency required for periodic route maintenance messages, significant energy savings are achieved to support routing. The inventive principles may also be implemented in connection with other routing protocols including, for example, the Ad Hoc On Demand Distance Vector (AODV) routing protocol, the Dynamic Source Routing (DSR) protocol, and others.

In at least one implementation, the listening pattern between wireless nodes is adjusted based upon the physical characteristics of a node. For example, suppose a sensor network has a variety of different sensor types including temperature sensors, audio sensors, video sensors, etc. A relay network that needs to receive and route data from these sensors does not require the same duty cycle of communication for each of the different sensor types. For example, a temperature sensor may only require data values to be read once per second, an audio sensor might require data to be read 10 times per second, and a video sensor may require data to be read 40 times per second. Thus, a relay node in the network may listen to the nodes at the following rates: temperature sensors at 1/40, audio sensors at 1/4, and video sensors at 1/1. This allows the relay to limit wasteful listening to low duty cycle nodes, while still maintaining high communication rates with high duty cycle nodes.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method of communicating in an ad-hoc network comprising:

determining, at a first node, a category assigned to a neighbor node, the category being associated with a role of the neighbor node in the network with respect to the first node; and selecting a listening rate for listening for communications from said neighbor node based on the determined category.

2. The method of claim 1, further comprising:
repeating determining and selecting for at least one other neighbor node.

3. The method of claim 1, further comprising:
establishing a backbone communication path within the network, said backbone communication path including non-relay nodes, primary relay nodes, and secondary relay nodes, wherein non-relay nodes elect one neighbor node as a primary relay node for communicating, secondary relay nodes route packets between primary relay nodes, and primary relay nodes route packets along the backbone communication path, the backbone communication path being comprised of primary and secondary relay nodes with communication links therebetween.

4. The method of claim 1, wherein a medium access control (MAC) layer of said first node coordinates time-division multiple access (TDMA) communications with neighbor nodes, wherein the method further comprises communicating with neighbor nodes in accordance with the selected listening rate.

5. The method of claim 1, wherein:
said first node is a non-relay node; and
determining a category assigned to a neighbor node includes determining whether said neighbor node is: (a) a relay node elected by said first node as a primary relay node, (b) a relay node that has not been elected by said first node as a primary relay node, or (c) a non-relay node.

6. The method of claim 5, wherein selecting a listening rate comprises:
selecting a listening rate of once per send interval when said neighbor node is a relay node elected by said first node as a primary relay node;
selecting a hello message listening rate when said neighbor node is a relay node that has not been elected by said first node as a primary relay node, wherein said hello message listening rate is a rate that is less than once per send interval; and
selecting said hello message listening rate when said neighbor node is a non-relay node.

7. The method of claim 1, wherein:
said first node is a primary relay node; and
determining a category assigned to a neighbor node includes determining whether said neighbor node is: (a) a node that has elected said first node as its primary relay node, (b) a relay node, or (c) a non-relay node that has not elected said first node as its primary relay node.

8. The method of claim 7, wherein selecting a listening rate comprises:
selecting a listening rate of once per send interval when said neighbor node is a node that has elected said first node as its primary relay node;
selecting a listening rate of once per send interval when said neighbor node is a relay node; and
selecting a hello message listening rate when said neighbor node is a non-relay node that has not elected said first node as its primary relay node, wherein said hello message listening rate is a rate that is less than once per send interval.

9. The method of claim 1, wherein:
said first node is a secondary relay node; and determining a category assigned to a neighbor node includes determining whether said neighbor node is: (a) a relay node, or (b) a non-relay node.

10. The method of claim 9, wherein selecting a listening rate comprises:
selecting a listening rate of once per send interval when said neighbor node is a relay node; and
selecting a hello message listening rate when said neighbor node is a non-relay node, wherein said hello message listening rate is a rate that is less than once per send interval.

11. An article comprising a computer readable storage medium having instructions stored thereon that, when executed by a computing platform, result in:
determining, at a first node, a category assigned to a neighbor node in a wireless network, the category being associated with a role of the neighbor node in the wireless network with respect to the first node; and
selecting a listening rate for listening for communications from said neighbor node based on the determined category.

12. The article of claim 11, wherein the instructions, when executed by the computing platform, further result in:
repeating determining and selecting for at least one other neighbor node.

13. The article of claim 11, wherein the instructions, when executed by the computing platform, further result in:
establishing a backbone communication path within the wireless network, said backbone communication path including non-relay nodes, primary relay nodes, and secondary relay nodes, wherein non-relay nodes elect one neighbor node as a primary relay node for communicating, secondary relay nodes route packets between primary relay nodes, and primary relay nodes route packets along the backbone communication path, the backbone communication path being comprised of primary and secondary relay nodes with communication links there between.

14. The article of claim 11, wherein:
said first node is a non-relay node; and
determining a category assigned to a neighbor node includes determining whether said neighbor node is: (a) a relay node elected by said first node as a primary relay node, (b) a relay node that has not been elected by said first node as a primary relay node, or (c) a non-relay node.

15. The article of claim 14, wherein selecting a listening rate comprises:
selecting a listening rate of once per send interval when said neighbor node is a relay node elected by said first node as a primary relay node;
selecting a hello message listening rate when said neighbor node is a relay node that has not been elected by said first node as a primary relay node, wherein said hello message listening rate is a rate that is less than once per send interval; and
selecting said hello message listening rate when said neighbor node is a non-relay node.

16. The article of claim 11, wherein:
said first node is a primary relay node; and
determining a category assigned to a neighbor node includes determining whether said neighbor node is: (a) a node that has elected said first node as its primary relay node, (b) a relay node, or (c) a non-relay node that has not elected said first node as its primary relay node.

17. The article of claim 16, wherein selecting a listening rate comprises:

selecting a listening rate of once per send interval when said neighbor node is a node that has elected said first node as its primary relay node;

selecting a listening rate of once per send interval when said neighbor node is a relay node; and selecting a hello message listening rate when said neighbor node is a non-relay node that has not elected said first node as its primary relay node, wherein said hello message listening rate is a rate that is less than once per send interval.

18. The article of claim 11, wherein:

said first node is a secondary relay node; and determining a category assigned to a neighbor node includes determining whether said neighbor node is: (a) a relay node, or (b) a non-relay node.

19. The article of claim 18, wherein selecting a listening rate comprises:

selecting a listening rate of once per send interval when said neighbor node is a relay node; and selecting a hello message listening rate when said neighbor node is a non-relay node, wherein said hello message listening rate is a rate that is less than once per send interval.

* * * * *